United States Patent [19]

Hatono et al.

[11] Patent Number: 4,568,200
[45] Date of Patent: Feb. 4, 1986

[54] METHOD OF AND APPARATUS FOR MEASURING SURFACE TEMPERATURE OF METALLIC BODY

[75] Inventors: Akio Hatono; Sumio Kobayashi; Toshiyuki Sugimura; Shunji Mihayara, all of Amagasaki, Japan

[73] Assignee: Sumitomo Metal Industries, Ltd., Osaka, Japan

[21] Appl. No.: 448,826

[22] Filed: Dec. 10, 1982

[30] Foreign Application Priority Data

Dec. 14, 1981 [JP] Japan ............................. 56-201803

[51] Int. Cl.[4] .................... G01J 5/00; G01R 23/00
[52] U.S. Cl. .......................... 374/122; 324/58.5 C; 343/351; 356/352; 364/557
[58] Field of Search .......... 374/122, 121, 129, 127, 374/170, 122, 117; 343/703, 100 ME; 356/345, 352, 43; 324/58.5 C; 364/557

[56] References Cited

U.S. PATENT DOCUMENTS

| | | | |
|---|---|---|---|
| 3,451,254 | 6/1969 | Maley | 374/124 |
| 3,586,970 | 6/1971 | Conway et al. | 374/122 |
| 3,638,494 | 2/1972 | Broussand et al. | 374/122 |
| 3,927,369 | 12/1975 | Billeter et al. | 324/58.5 C |
| 4,050,015 | 9/1977 | Zollner | 324/58.5 C |
| 4,235,107 | 11/1980 | Lüdeke et al. | 374/122 |
| 4,369,404 | 1/1983 | Flygave et al. | 324/58.5 C |
| 4,459,042 | 7/1984 | Paros | 374/117 |

FOREIGN PATENT DOCUMENTS

| | | | |
|---|---|---|---|
| 2100799 | 6/1972 | Fed. Rep. of Germany | 374/122 |
| 94229 | 7/1981 | Japan | 374/122 |

OTHER PUBLICATIONS

"Using Microwave Techniques for Hi Temp. Measurement", T. Roger Billeter, 2/1972, Instruments & Control Systems, pp. 107–108.

Primary Examiner—Daniel M. Yasich
Attorney, Agent, or Firm—Burns, Doane, Swecker & Mathis

[57] ABSTRACT

Disclosed is a method of measuring the surface temperature of a metallic body. The method comprises: disposing a reflecting member such that the reflecting member constitutes a resonator in cooperation with a substantially flat surface of the metallic body; measuring the mean reflectivity of the resonator over a predetermined frequency band having a center frequency coinciding with the resonance frequency of the resonator, as well as the luminance temperature of the resonator; and computing the surface temperature of the metllic body from these measured values. Disclosed also is an apparatus for carrying out this measuring method. The method and apparatus are suited particularly to the measurement of the surface temperature of a steel sheet heated to a temperature ranging between 500° and 800° C.

18 Claims, 5 Drawing Figures

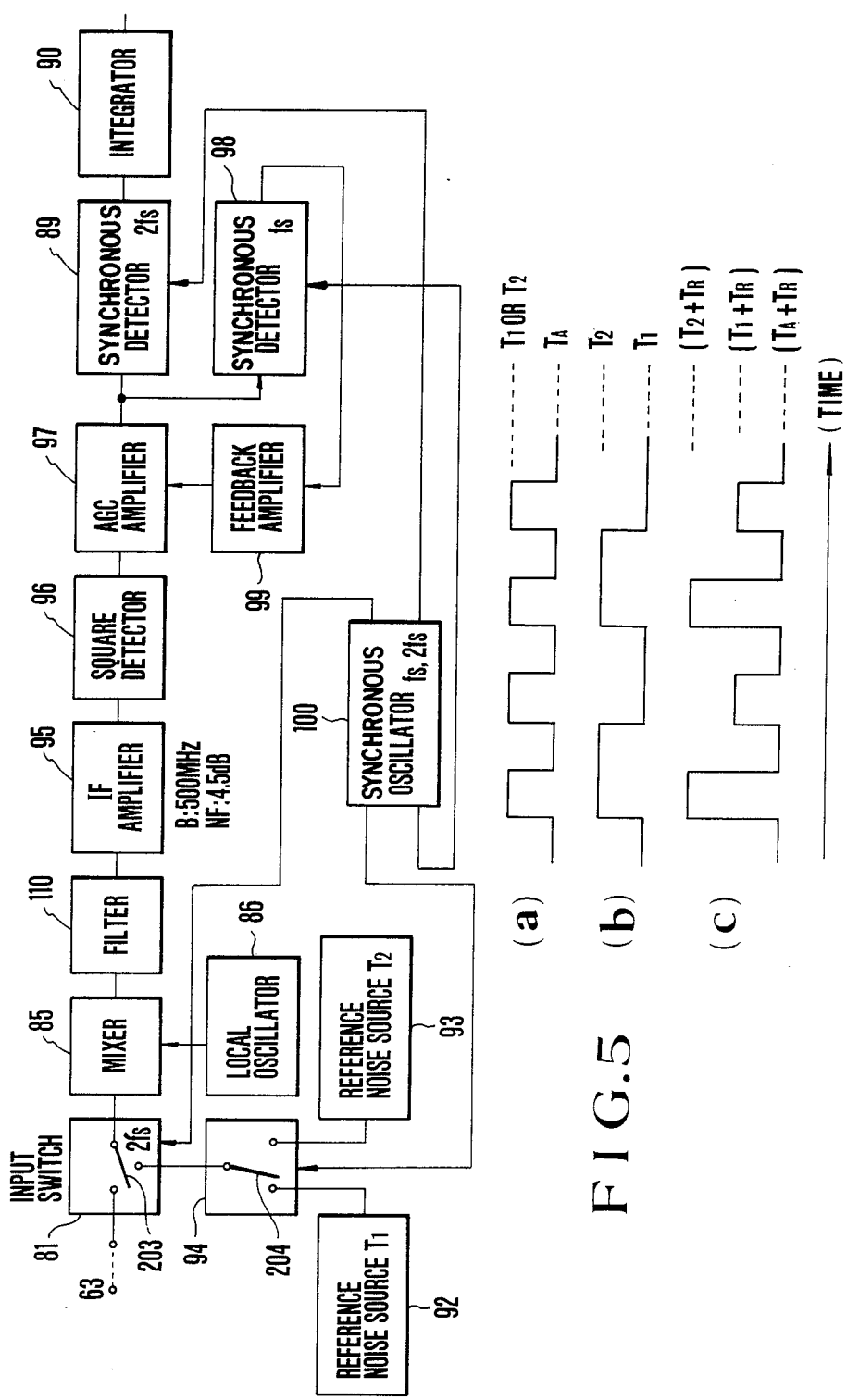

METHOD OF AND APPARATUS FOR MEASURING SURFACE TEMPERATURE OF METALLIC BODY

BACKGROUND OF THE INVENTION

The present invention relates to a method of measuring the surface temperature of a metallic body and also to an apparatus for measuring the surface temperature of a metallic body. More particularly, the present invention is concerned with a method of and apparatus for measuring temperature, suited for the measurement of surface temperature of a metallic body heated to a temperature of about 500° to 800° C., such as steel sheet in continuous annealing furnace.

Typical conventional non-contact type methods for measuring the temperature of a hot metallic body employ a radiation pyrometer or an optical pyrometer capable of measuring the surface temperature of the metallic body through detection of heat energy radiated from the metallic body. In these known methods, however, the accuracy of the measurement is deteriorated by fluctuations of the emissivity of the metallic body as the measuring object. To avoid this, it has been attempted to determine the emissivity correctly by, for example, making use of a reference radiation. This determination of emissivity, however, requires much time inconveniently. Accurate measurement of the emissivity itself is materially impossible when the emissivity is as small as 0.1 to 0.2.

SUMMARY OF THE INVENTION

Accordingly, it is an object of the invention to provide a method of accurately measuring the surface temperature of a metallic body, as well as an apparatus for carrying out the method, thereby to overcome the above-described problems of the prior art.

It is another object of the invention to provide a method of and apparatus for accurately measuring the surface temperature of a metallic body even when the latter has a low emissivity.

According to an aspect of the invention, there is provided a method of measuring the surface temperature of a metallic body comprising the steps of: disposing a reflecting member in such a manner that the reflecting member in cooperation with a substantially flat surface of the metallic body constitutes a Fabry-Pérot type resonator; measuring the mean reflectivity of the resonator over a predetermined frequency band having a center frequency coinciding with the resonance frequency of the resonator and measuring also the luminance temperature $T_A$ of the resonator; and determining the surface temperature $T_t$ of the metallic body from the measured mean reflectivity and luminance temperature $T_A$.

According to a feature of the invention, the surface temperature $T_t$ of the metallic body is determined in accordance with the following formula:

$$T_t = \frac{T_A - \bar{\epsilon}_m T_m}{1 - \bar{\rho} - \bar{\epsilon}_m} \quad (1)$$

where, $T_A$: luminance temperature of resonator
$T_m$: temperature of reflecting member
$\bar{\rho}$: mean relfectivity of resonator over the frequency band B
$\bar{\epsilon}_m$: mean emissivity of reflecting member over the frequency band B For instance, when the metallic body as the measuring object is a steel member of a temperature between 500° C. and 800° C., while the reflecting member is made of a material having a dielectric constant and electric conductivity negligibly small as compared with those of steel and maintained at a temperature below 100° C. by water cooling, the temperature $T_t$ of the metallic body may be computed in accordance with the following formula:

$$T_t = \frac{T_A}{1 - \bar{\rho}}$$

According to another feature of the invention, the reflecting member is preferably a concaved mirror which constitutes, in cooperation with the surface of the metallic member, a Fabry-Pérot type resonator, the mirror having a focal length F which is greater than a half of the distance d between the surface of the metallic body and the concaved mirror.

According to a further feature of the invention, the measurement of the mean reflectivity $\bar{\rho}$ is conducted by inputting microwave of a frequency band containing the resonance frequency of the resonator through the reflecting member to the resonator, determining the resonance frequency of the resonator from the reflected wave outputted from the resonator, and determining, as the mean reflectivity $\bar{\rho}$, the ratio between the energy of the reflected wave over a predetermined band B having a center frequency coinciding with the measured resonance frequency and the energy of the inputted wave over the band B having the center frequency coinciding with the measured resonance frequency.

According to a still further feature of the invention, the measurement of the luminance temperature of the resonator is made by means of a Dicke type radiometer. Preferably, the compensation of fluctuations of gain in the amplifier of the radiometer is conducted by means of two reference noise sources.

According to another aspect of the invention, there is provided an apparatus for measuring the surface temperature of a metallic body comprising: a reflecting member disposed to oppose to a substantially flat surface of the metallic body in such a manner as to constitute a resonator in cooperation with the substantially flat surface; an antenna disposed at the reflecting center of the reflecting member; a first switch means including a switch connected to the antenna and two terminals adapted to be selectively connected to the switch; a reflectivity measuring means connected to one of the terminals of the first switch means, the reflectivity measuring means including an oscillator adapted to oscillate microwave of an oscillation frequency band containing the resonance frequency of the resonator, a detector, a second switch means adapted to connect the output of the oscillator to the antenna through the first means and to input the reflected wave from the resonator to the detector through the first switch means, the second switch means being further adapted, when switched, to input the output of the oscillator directly to the detector, and a reflectivity determining means adapted to detect, through connection to the detector, the level of reflected wave from the resonator and the level of output from the oscillator and to determine the reflectivity of the resonator from the ratio between the level of the reflected wave and the level of the output from the oscillator; a radiometer connected to the other of the terminals of the first switch means and adapted to measure the luminance temperature of the resonator; and a computing means adapted to compute the temperature of the surface of the metallic body from the reflectivity and the luminance temperature of the resonator.

According to feature of another aspect of the invention, the reflectivity determining means includes: a third switch means having a switch connected to the output of the detector, and first and second terminals adapted to be connected with said switch in synchronism with the switching operation of the second switch means; a first memory with integrator connected with the first terminal of the third switch means to thereby receive the output level of the reflected wave from the resonator; a second memory with integrator connected with the second terminal of the third switch means to thereby receive the output level from the oscillator; and a dividing means adapted to conduct a dividing computation for determining the ratio $V_1/V_2$ between the energy value $V_1$ of the wave reflected by the resonator over a predetermined frequency band B, the energy value $V_1$ being delivered by the first memory with integrator, and the energy value $V_2$ of the output from the oscillator over the frequency band B, the energy value $V_2$ being delivered by the second memory with integrator.

According to another feature of the invention, the radiometer includes: a reference noise source; a clock means; a fourth switch means having a first input terminal connected to the antenna through the first switch means, a second input terminal connected to the reference noise source and an output terminal adapted to be selectively connected to one of the first and second input terminals in synchronism with the clock means; a band detecting means for detecting the output from the fourth switch means in the frequency band B; a synchronous detector adapted to detect the output from the band detecting means in synchronism with the clock means; an integrator connected to the synchronous detector; and a luminance temperature computing means adapted to compute the luminance temperature of the resonator from the output of the integrator.

According to a further feature of the invention, the reference noise source includes: a first reference noise source; a second reference noise source; a second clock means; and a fifth switch means adapted to alternatingly connect the first and second reference noise sources to the input of the fourth switch in synchronism with the second clock means, while the radiometer further includes a feedback loop constituted by a second synchronous detector for detecting the output of preamplifying section of the synchronous detector and an amplifier adapted to calibrate the output from the second synchronous detector in accordance with the actual difference in the luminance temperature between the first and second reference noise sources and to feed the calibration signal back to the preamplifying section of the synchronous detector thereby to compensate for the gain fluctuations in the preamplifying section.

As will be understood from the foregoing statement, the method and apparatus of the invention relies upon an accurate measurement of the emissivity of a resonator, making use of an electric power absorption caused by a resonance of microwave in the resonator.

The resonance frequency upon which the present invention relies varies according to the resonator which is composed of the reflecting member and the metallic body as the measuring object. The resonance frequency, however, is a microwave on the order of 1 GHz in the wide-range measurement of the surface temperature and on the order of 100 GHz in the case of narrow-range measurement of the surface temperature.

BRIEF DESCRIPTION OF THE DRAWINGS

Other objects, features and advantages of the invention will become clear from the following description of the preferred embodiments taken in conjunction with the accompanying drawings in which:

FIG. 4 is a block diagram of a radiometer for measuring the luminance temperature of the resonator incorporated in an embodiment of the invention; and FIGS. 5a to 5c schematically illustrates the operation of radiometer shown in FIG. 4.

DESCRIPTION OF THE PREFERRED EMBODIMENT

Figure 1:
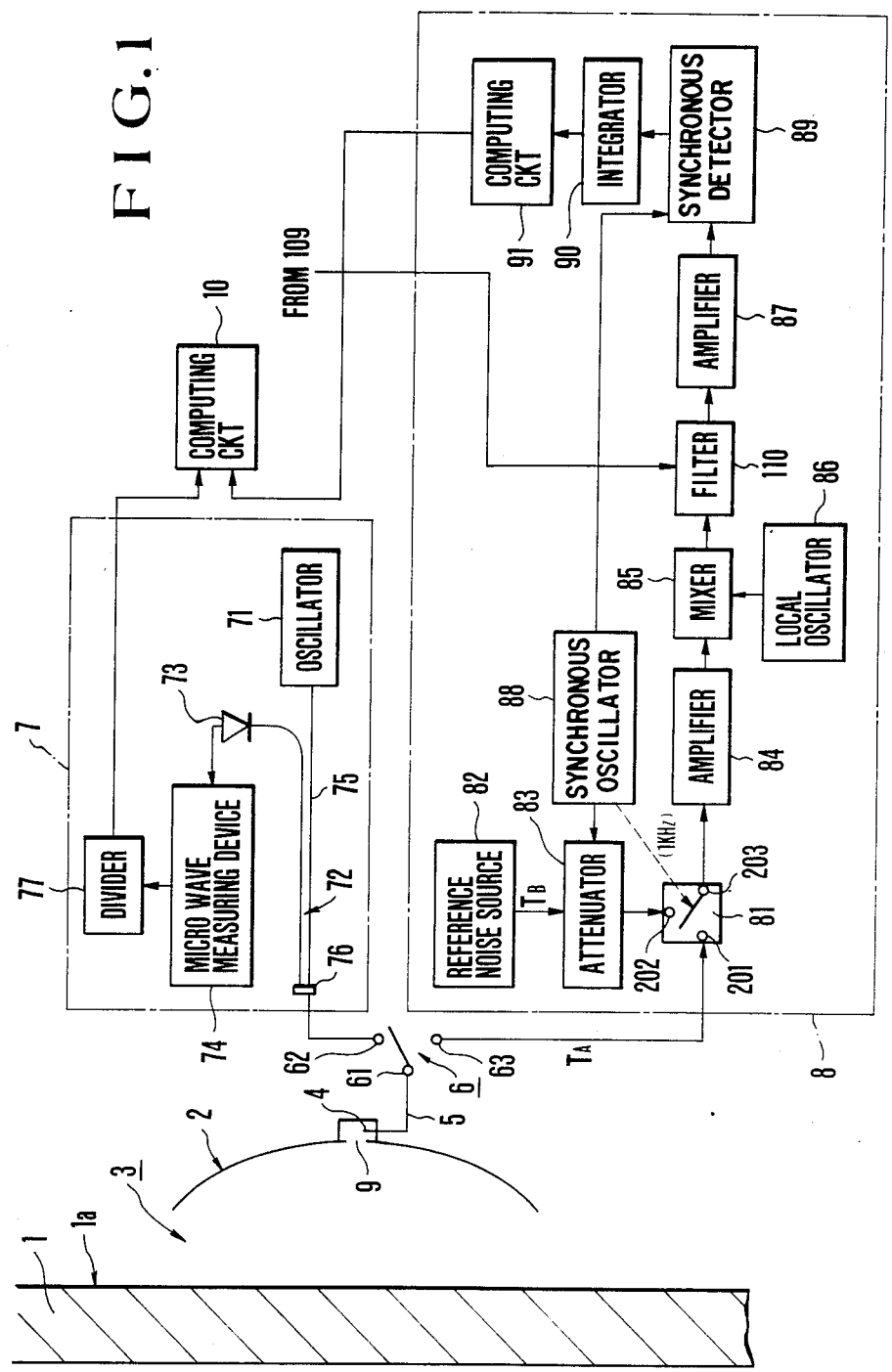
FIG. 1 is a block diagram of a temperature measuring apparatus in accordance with an embodiment of the invention.

The principle of the invention is based upon the discovery of the following fact. Namely, assume here a resonator composed of the surface of a metallic body the temperature of which is to be measured and a reflecting member and also that a microwave of a frequency band containing the resonance frequency $f_o$ of the resonator is applied to the resonator, an absorption of the electric power takes place to make the reflectivity $\bar{p}$ of the resonator much smaller than 1 in the region near the resonance frequency $f_o$ thereby to permit an accurate measurement of the emissivity of the resonator.

The term "resonator" in this specification is used to mean a system which is constituted by the surface of the reflecting member, the surface of the metallic body as the measuring object and the space defined between these surfaces. A resonance of microwave of a predetermined frequency takes place in this resonator.

The nature of the resonator is determined by various factors such as sizes and shapes of the surfaces of the reflecting member and the metallic body, distance between these surfaces and so forth.

For instance, when the reflecting member is a concaved mirror having a focal length F while the surface of the metallic body as the temperature measuring object is flat, it is necessary that the distance d between two surfaces are determined to meet the following condition:

$$0 < d < 2F$$

With this knowledge, the present inventors have found a novel method and apparatus for accurately measuring the mean reflectivity of the resonator over an extremely narrow frequency band having a center frequency coinciding with the resonance frequency $f_o$ of the resonator.

The present inventors on the other hand made a study seeking for any definite relationship between the temperatures of the surface of the metallic body, surface of the reflecting member, as well as the temperature of the resonator, and the emissivity, and found that the following relationships exist therebetween.

$$\bar{\epsilon} = 1 - \bar{\rho} \quad (2)$$

$$\bar{\epsilon} = \bar{\epsilon}_m + \bar{\epsilon}_t \quad (3)$$

$$T_A = \bar{\epsilon}_m T_m + \bar{\epsilon}_t T_t \quad (4)$$

where, $\bar{\epsilon}$: mean emissivity of resonator in frequency band B centered at the resonance frequency $f_o$ $\bar{\epsilon}_m$: mean emissivity of reflecting member in frequency band B $T_A$: luminance temperature of resonator in the frequency band B $T_m$: temperature of reflecting member $T_t$: temperature of metallic body The term "luminance temperature of resonator" is used here to mean the level V of thermal radiation converted to electric power outputted from the resonator itself in the state in which no external microwave is inputted to the resonator. On the other hand, the "mean reflectivity of the resonator" is used to mean the value which is obtained, when an microwave of a level $V_1$ at a predetermined frequency is delivered externally to the resonator, by dividing the level Va of the output microwave reflected by the resonator by the level $V_1$ of the input wave. The formula (1) mentioned before is derived from formulae (2) to (4).

In the formula (1) above, the mean emissivity $\bar{\epsilon}_M$ and the temperature Tm of the reflecting member can be obtained beforehand. It is, therefore, possible to determine the surface temperature Tt of the metallic body from the formula (1), simply by measuring the mean reflectivity $\bar{\rho}$ and the luminance temperature $T_A$ of the resonator.

Provided that the metallic body as the measuring object is a steel member of a temperature ranging between 500° and 800° C., while the reflecting member is made of a material having a dielectric constant and electric conductivity negligibly small as compared with those of steel and that the temperature is sufficiently low, the temperature Tt may be determined in accordance with the following formula (5) neglecting $\bar{\epsilon}_m$ and $T_m$.

$$T_t = \frac{T_A}{1 - \bar{\rho}} \quad (5)$$

Referring now to FIG. 1 schematically showing the basic arrangement of an apparatus suitable for carrying out the method of the invention, a metallic body 1 as the temperature measuring object has a surface 1a the temperature of which is to be measured. A reflecting plate 2 such as a concaved mirror of copper is disposed to oppose to the surface 1a of the metallic body. The metallic body 1 and the reflecting plate 2 in cooperation constitute a Fabry-Pérot type resonator 3.

An antenna 4 is connected to a common terminal 61 of a change-over switch 6 through a coaxial cable 5. One 62 of the change-over terminals of the change-over switch 6 is connected to a suitable measuring device 7 for measuring the mean reflectivity $\bar{\rho}$ (see FIG. 2) of the resonator 3 over a frequency band B having a center frequency coinciding with the resonance frequency $f_o$ of the resonator 3, while the other change-over terminal 63 is connected to a radiometer 8 adapted for measuring the luminance temperature of the resonator 3.

In order to deliver the output of the resonator 3 to the reflectivity measuring device 7 or to the radiometer 8 through the antenna 4 and the change-over switch 6, the antenna 4 is connected to the resonator 3 through a connection hole 9 formed substantially in the center of the reflecting plate 2. On the other hand, the change-over switch 6 may be constructed so as to be actuated by a solenoid relay (not shown) which is energized in accordance with a suitable measuring sequence.

A temperature computing circuit 10 receives both of the information concerning the luminance temperature $T_A$ outputted from the radiometer 8 and the information concerning the mean reflectivity $\bar{\rho}$ outputted from the reflectivity measuring device 7. Namely, the computing circuit 10 is a circuit which is adapted to compute and determine the temperature of the metallic body 1 upon receipt of the mean reflectivity $\bar{\rho}$ outputted from the reflectivity measuring device 7 and the luminance temperature $T_A$ outputted from the radiometer 8.

In carrying out the measuring method of the invention, it is essential to space the reflecting plate 2 a predetermined distance from the surface of the metallic body 1 in such a manner that the reflecting plate 2 and the metallic body 1 in cooperation constitute a resonator 3 having a resonance frequency $f_o$.

Subsequently, the change-over switch 6 is turned to connect to the reflectivity measuring device 7 thereby to measure the mean reflectivity $\bar{\rho}$ of the resonator 3. In the illustrated embodiment, a microwave oscillator 71 generates a microwave of a frequency band having a center frequency coinciding with the resonance frequency $f_o$ and applies the same to the resonator 3 through a wave guide tube 75. Meanwhile, the output microwave reflected by the resonator 3 is introduced to the detector 73 through a directional coupler 76, and the mean value $V_2$ of the detection outputs from the detector 73 is measured by a microwave measuring device 74. Then, a state of reflectivity $\rho$ being 1 ($\rho = 1$) is created by shortcircuiting the wave guide tube 75 by the switch 76 and the mean value $V_1$ of the detection output in this state is measured. Then, the reflectivity computing circuit or divider 77 computes the mean reflectivity $\bar{\rho}$ ($= V_1/V_2$) from the thus measured mean values $V_2$ and $V_1$.

Figure 3:
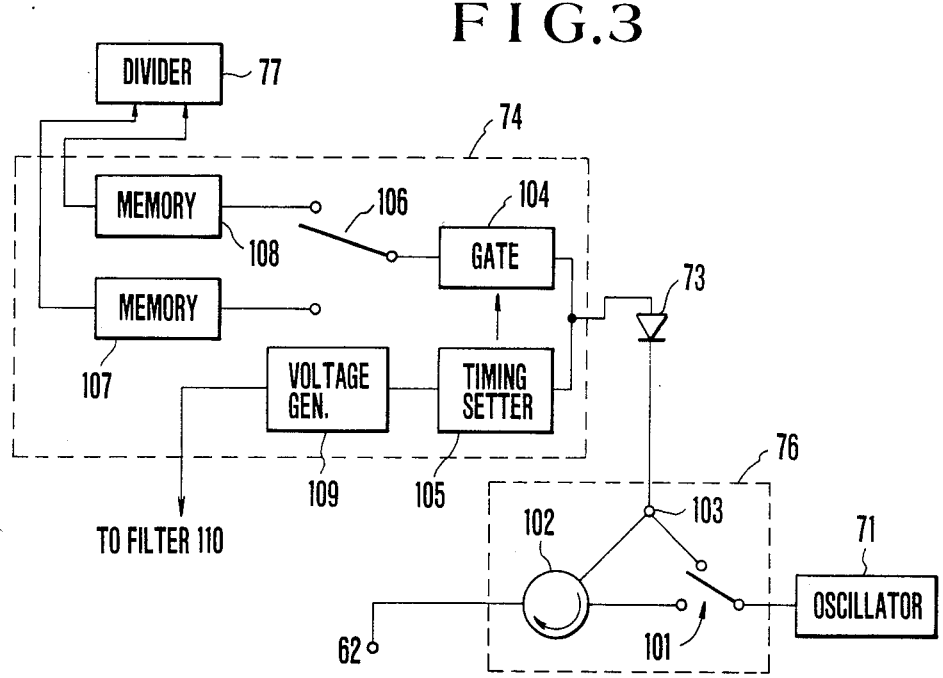
FIG. 3 is a block diagram of an example of a reflectivity measuring device incorporated in an apparatus of the invention.

FIG. 3 is a block diagram of a preferred form of the device 7 for measuring the reflectivity of the resonator incorporated in the apparatus for carrying out the method of the invention.

Referring to FIG. 3, the oscillator 71 is adapted to generate microwaves of frequency band which is sufficiently wider than the predetermined frequency band B and having a center frequency substantially coinciding with the resonance frequency $f_o$. A switch 76 constituting a second switch means of the invention includes a switch 101 controlled in accordance with a measuring sequence (not shown) and a circulator 102. Thus, the output from the oscillator 71 is delivered to the detector 73 through a terminal 103 or to the terminal 62 through the circulator 102, in accordance with the state of the switch 101. On the other hand, the reflected wave transmitted through the switch 6 from the antenna 4 is always supplied to the detector 73 through the circulator 102.

On the other hand, the microwave measuring device 74 is provided with a gate 104 connected to the detector 73, and a timing setting device 105 which is adapted to open the gate 104 over a time period corresponding to the aforementioned predetermined band B, when the output from the detector 73 takes a value smaller than a predetermined threshold value. The output from the gate 104 is connected to a common terminal of a switch 106 constituting a third switch means of the invention, while other terminals of the switch 106 are connected to memories 107 and 108 equipped with integrators, respectively. The switch 106 is adapted to operate in synchronism with the switch 101.

More specifically, when the switch 101 is connected to the circulator 102, the microwave coming from the oscillator 71 is inputted to the resonator 3 through the switch 6, while the reflected wave is delivered to the detector 73 by the circulator 102 through the switch 6. In this state, since the switch 106 also is connected to the memory 107, the reflected wave voltage detected by the detector is inputted to the memory 107 through the gate 104 and the switch 106, and is integrated by the integrator (memory) 107 over a period corresponding to the frequency band B centered at the resonance frequency $f_o$ and set by the timing setting device 105. The result of the integration is delivered to a divider 77.

On the other hand, while the switch 101 is connected to the terminal 103, the microwave coming from the oscillator 71 is delivered directly to the detector 73 through the terminal 103, and is inputted to the integrator (memory) 108 and integrated over a time period set by the timing setting device 105. The result of this integration also is delivered to the divider 77.

Figure 2:
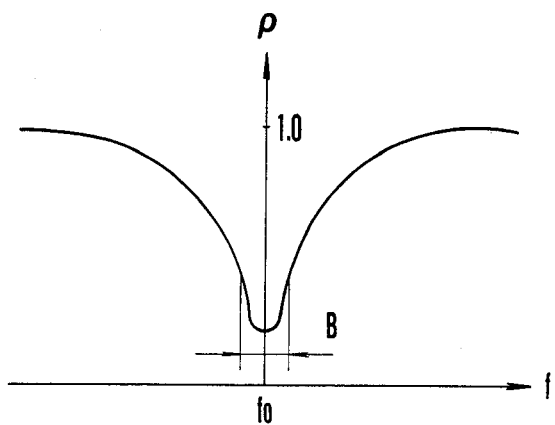
FIG. 2 is a graph showing the change in the reflectivity of a resonator.

According to the method of the invention, it is attempted to determine the mean value $\bar{p}$ of the reflectivity $p$ in the frequency band having a center frequency coinciding with the resonance frequency $f_o$ shown in FIG. 2. The center frequency of the resonator 3, however, is changed in accordance with a change in the position of the metallic body surface $1a$ relative to the reflecting member 2 or a change in the shape of the same. It is, therefore, necessary to vary the frequency range (band width B) for the measurement of the luminance temperature by the radiometer 8, in accordance with the change in the center frequency $f_o$. To this end, a voltage generator 109 generates a voltage output corresponding to the time length set by the timing setter 105, and applies the same to a voltage controlled microwave filter 110 thereby to change the frequency band of the measurement by the radiometer.

Referring back to FIG. 1, an explanation will be made as to the radiometer 8 for measuring the luminance temperature of the resonator 3.

As will be seen from this Figure, the radiometer 8 has a switch 81 constituting a fourth switch of the invention. The switch 81 includes a change-over terminal 201 for connection to the change-over terminal 63 of the switch 6, and a change-over terminal 202 connected to a reference noise source 82 through a attenuator 83. The operating terminal 203 of the switch 81 is controlled by a synchronous oscillator 88 at a predetermined frequency, e.g. 1 KHz. The signal representing the luminance temperature of the resonator 3, Dicke-modulated by the switch 81, is amplified by an amplifier 84 and is transformed into an intermediate frequency (IF) B by a mixer 85 in accordance with a constant frequency from the local oscillator 86, and filtered by the controlled microwave filter 110 thereby to pass the signal having the frequency band B centered at the resonance frequency $f_o$. The filtered signal is then further amplified at a suitable gain by an amplifier 87.

A synchronous detector 89 is adapted to operate in synchronism with the synchronous oscillator 88 to demodulate and detect the Dicke-modulated signal. An integrator 90 is adapted to make an integration of the detected signal in the frequency band B over a constant time period, while a computer 91 computes the luminance temperature $T_A$ from the output of the integrator 90.

As explained before, the radiometer 8 shown in FIG. 1 is adapted to effect a Dicke-modulation of the signal with the microwave generated by the reference noise source 82 and to perform synchronous detection and integration. The radiometer, therefore, can measure the luminance temperature $T_A$ at a high accuracy from a weak heat radiation electric power coming from the resonator 3.

FIG. 4 shows a Dicke's type radiometer having an AGC (Automatic Gain Control) function advantageously used in the present invention. In this Figure, the same reference numerals are used to denote the same parts or members as those of the radiometer shown in FIG. 1, and the explanation will be focussed mainly on the points of difference from the radiometer shown in FIG. 1.

Two reference noise sources 92 and 93 are connected to a second terminal of the fourth switch means 81 through a switch 94 which constitutes a fifth switch means of the invention. The operation terminal 203 of the switch 81 is controlled by a frequency which is a multiple (twice in the illustrated embodiment) of the control frequency $f_S$ of the operation terminal 204 of the switch 94. Thus, the microwave signal from the antenna 4 is Dicke-modulated by the noise electric power signal corresponding to the reference temperatures $T_1$ and $T_2$ from two reference noise sources 92 and 93. Then, the microwave signal is transformed into intermediate frequency by the mixer 85 and, after being processed by an IF amplifier 95 and the square detector 96, inputted to an amplifier 97. The output from the amplifier 97 in one hand is delivered to a synchronous detector 89 adapted to effect a synchronous detection at a frequency $2f_S$ and on the other hand given directly to a second detector 98 which is adapted to effect a synchronous detection at the frequency $f_s$. The output, therefore, is proportional to the product of the value $(T_2 - T_1)/2$ which is known and the gain of the amplifier. It is, therefore, possible to effect a compensation for a change in the gain of the radiometer through controlling the amplifier 97 by means of the control signal which is derived from the feedback amplifier 99 and capable of compensating for the difference.

The switch 81 and the synchronous detector 89 are controlled at the frequency $2f_s$ coming from the synchronous oscillator 100, while the switch 94 and the second synchronous detector 98 are controlled at the frequency $f_s$ as illustrated.

FIGS. 5a to 5c schematically show the relationship between the input signal from the terminal 63 and the input signals from the reference noise sources 92 and 93. Here "$T_R$" denotes the noise temperature of the radiometer 8 itself.

The temperature Tt of the metallic body 1 is then computed in accordance with the formula (1) mentioned before, from the values such as mean reflectivity $\bar{p}$ of the resonator 3 and the luminance temperature $T_A$ of the resonator 3 which are determined in a way heretofore described and the temperature Tm of the reflecting member and the mean emissivity $\bar{\epsilon}_m$ which have been obtained beforehand. This computation of the formula is performed by a temperature computing circuit 10 shown in FIG. 1.

Preferably, a water-cooled copper concaved mirror is used as the reflecting member 2 such that the reflecting member 2 constitutes a Fabry-Pérot type resonator in cooperation with the surface 1a of the matallic body.

EXPERIMENTAL EXAMPLE

The temperature of a steel plate was measured by means of the apparatus of the invention shown in FIG. 1, in accordance with the condition shown in Table 1 below, the result of which is shown in Table 2 together with the result of which is shown in Table 2 together with the result of measurement conducted by a radiation pyrometer.

From Table 2, it will be seen that the measuring method in accordance with the invention provides a high measuring accuracy which well compared with that of silicone radiation pyrometer in spite of a construction which is much simpler than that of the silicone radiation pyrometer.

TABLE 1

| Measuring Condition | |
|---|---|
| specification of concaved mirror | copper, 195 mmφ, focal length 70.8 mm |
| resonance frequencey | 10.5 GHz |
| band width | 70 MHz |
| integrating time | 5 sec. |

TABLE 2

| | | Result of Measurement | |
|---|---|---|---|
| measuring object | steel plate temperature | measurement by apparatus of invention | measurement by radiation pyrometer |
| steel plate | No. 1 | 1015° K | 1018° K | 1013° K |
| | No. 2 | 948 | 947 | 950 |
| | No. 3 | 870 | 871 | 872 |
| | No. 4 | 920 | 926 | 924 | radiation pyrometer: silicone radiation pyrometer steel plate temperature: measured by PR thermocouple Although the invention has been described through specific terms, it is to be noted here that the described embodiment is not exclusive but merely illustrative. For instance, it is possible to use frequencies of millimeter wave band in place of the microwaves used in the described embodiment.

What is claimed is:

1. A method of measuring the surface temperature of a heated metallic body comprising the steps of:
    positioning a reflecting member opposed to and spaced a predetermined distance from a substantially flat surface of said metallic body wherein said reflecting member and said substantially flat surface of said metallic body constitute a resonator having a resonance frequency in the microwave frequency range;
    supplying said resonator with a microwave having a frequency band with a center frequency substantially equal to said resonance frequency of said resonator;
    measuring the mean reflectivity $\bar{\rho}$ of said resonator over said frequency band;
    measuring also the luminance temperature $T_A$ of said resonator; and
    calculating the surface temperature $T_t$ of said metallic body from the measured mean reflectivity and luminance temperature in accordance with the general formula $$T_t = \frac{T_A}{1 - \bar{\rho}}.$$

2. A method according to claim 1, wherein the surface temperature Tt of said metallic body is determined in accordance with the following formula:

$$T_t = \frac{T_A - \bar{\epsilon}_m T_m}{1 - \bar{\rho} - \bar{\epsilon}_m}$$

where,
$T_A$: luminance temperature of resonator
$T_m$: temperature of reflecting member
$\bar{\rho}$: mean reflecting power of resonator over the frequency band B
$\bar{\epsilon}_m$: mean radiation rate of reflecting member over the frequency band B 3. A method according to claim 2, wherein the measurement of said mean reflectivity $\bar{\rho}$ is conducted by inputting electromagnetic wave of a frequency band containing the center frequency of said resonator through said reflecting member to said resonator, determining the resonance frequency of said resonator from the reflected wave outputted from said resonator, and determining, as the mean reflectivity $\bar{\rho}$, the ratio between the energy of the reflected wave over a predetermined band B having a center frequency coinciding with the measured resonance frequency and the energy of the inputted wave over the band B having the center frequency coinciding with the measured resonance frequency.

4. A method according to claim 3, wherein the measurement of said luminance temperature of said resonator is conducted by a Dicke-modulation using the heat radiation electric power of the resonator itself in the above-mentioned band B and the heat radiation electric power of at least one reference noise source.

5. A method according to claim 4, wherein two reference noise sources are used to improve the accuracy of measurement by making use of the difference of heat radiation electric power between these noise sources.

6. A method according to claim 1, wherein said reflecting member is a concaved mirror having a focal length greater than one-half the distance between said substantially flat surface and said mirror.

7. A method according to claim 1, wherein said metallic body is a steel body heated to a temperature ranging between 500° C. and 800° C.

8. An apparatus for measuring the surface temperature of a heated metallic body comprising: a reflecting member positioned a predetermined distance and opposed to a substantially flat surface of said metallic body in such a manner as to constitute a resonator in cooperation with said substantially flat surface, said reflecting member having a connection hole formed substantially in the center thereof; an antenna disposed in said connection hole; a first switch means including a switching element connected to said antenna and two terminals adapted to be selectively connected to said switch; a reflectivity measuring means connected to one of the terminals of said first switch means, said reflectivity measuring means including an oscillator adapted to oscillate at a microwave frequency within a frequency band containing the resonance frequency of said resonator, a detector, a second switch means adapted to connect the output of said oscillator to said antenna through said first switch means and to input the reflected wave from said resonator to said detector through said first switch means, said second switch means being further adapted, when switched, to input the output of said oscillator directly to said detector, and a reflectivity determining means adapted to detect, through connection to said detector, the level of reflected wave from said resonator and the level of output from said oscillator and to determine the reflectivity of said resonator from the ratio between the level of the reflected wave and the level of the output from said oscillator; a radiometer connected to the other of the terminals of said first switch means and adapted to measure the luminance temperature of said resonator; and a computing means adapted to compute the temperature of the surface of said metallic body from the reflectivity and the luminance temperature of said resonator.

9. An apparatus according to claim 8, wherein said computing means is adapted to compute the surface temperature in accordance with the following formula:

$$T_t = \frac{T_A - \epsilon_m T_m}{1 - \rho - \epsilon_m}$$

where,
 Tt: surface temperature of metallic body
 $T_A$: luminance temperature of resonator
 Tm: temperature of reflecting member
 $\rho$: reflectivity of resonator
 $\epsilon_m$: emissivity of reflecting member 10. An apparatus according to claim 8, wherein said reflectivity determining means includes: a third switch means having switch connected to the output of said detector, and first and second terminals adapted to be connected to said switch in synchronism with the switching operation of said second switch means; a first memory with integrator adapted to receive the output level of the reflected wave from said resonator through connection to said first terminal of said third switch means; a second memory with integrator adapted to receive the output level from said oscillator through connection to said second terminal of said third switch means; and a dividing computing means adapted to conduct a dividing computation for determining the ratio $V_1/V_2$ between the energy value $V_1$ of the wave reflected by said resonator over a predetermined frequency band B, said energy value $V_1$ being delivered by said first memory with integrator, and the energy value $V_2$ of the output from said oscillator over said frequency band B, said energy value $V_2$ being delivered by said second memory with integrator.

11. An apparatus according to claim 10, wherein said reflectivity determining means further includes a detecting means adapted to detect a timing at which the reflected wave output delivered by said detector takes a level below a predetermined threshold value, a timing means adapted to deliver gate signals to said first and second memories with integrators over a time period corresponding to the predetermined band B from the timing detected by said timing detecting means, and a voltage generator adapted to generate voltage output corresponding to the time length set by the gate signal.

12. An apparatus according to claim 8, wherein said radiometer is a Dicke's type radiometer.

13. An apparatus according to claim 12, wherein said radiometer includes: a reference noise source; a clock means; a fourth switch means having a first input terminal connected to said antenna through said first switch means, a second input terminal connected to said reference noise source and an output terminal adapted to be selectively connected to one of said first and second input terminals in synchronism with the clock means; a mixer adapted to mix the output from said fourth switch means with the output from a local oscillator; said local oscillator; a filter means adapted to pass the intermediate frequency signal only within said predetermined band width B; a detecting means; a synchronous detector adapted to detect the output from said band detecting means in synchronism with said clock means; an integrator connected to said synchronous detector; and a luminance temperature computing means adapted to compute the luminance temperature of said resonator from the output of said integrator.

14. An apparatus according to claim 13, wherein said reference noise source includes: a first reference noise source; a second reference noise source; a second clock means; and a fifth switch means adapted to alternatingly connect said first and second reference noise sources to the input of said fourth switch in synchronism with said second clock means.

15. An apparatus according to claim 14, wherein said radiometer further includes a feedback loop constituted by a second synchronous detector for detecting the output of preamplifying section of said synchronous detector and an amplifier adapted to feed a calibration signal back to the preamplifying section of said synchronous detector to make the output from said second synchronous detector constant.

16. An apparatus according to claim 14, wherein said radiometer further includes an IF amplifier adapted to amplify the output from said mixer, and a square detector for detecting the square of the amplified output signal from said IF amplifier.

17. An apparatus according to claim 8, wherein said reflecting member is a copper mirror having a concaved surface opposing to said metallic body and water-cooled to develop a constant temperature.

18. An apparatus according to claim 17, wherein said computing means is adapted to compute the surface temperature of said metallic body in accordance with the following formula:

$$T_t = \frac{T_A}{1 - \bar{\rho}}$$

where,
 $T_t$: surface temperature of metallic body
 $T_A$: luminance temperature of resonator
 $\bar{\rho}$: reflectivity of resonator

* * * * *